US012069506B2

(12) United States Patent
Ahmadi et al.

(10) Patent No.: US 12,069,506 B2
(45) Date of Patent: Aug. 20, 2024

(54) SYSTEMS AND METHODS FOR NETWORK FUNCTION DISCOVERY IN A SEGMENTED NETWORK

(71) Applicant: Verizon Patent and Licensing Inc., Basking Ridge, NJ (US)

(72) Inventors: Hossein M. Ahmadi, Parsippany, NJ (US); Violeta Cakulev, Milburn, NJ (US); Ali Imdad Malik, East Brunswick, NJ (US); Ye Huang, San Ramon, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 443 days.

(21) Appl. No.: 17/340,373

(22) Filed: Jun. 7, 2021

(65) Prior Publication Data

US 2022/0394540 A1 Dec. 8, 2022

(51) Int. Cl.
*H04W 28/02* (2009.01)
*H04L 41/12* (2022.01)

(52) U.S. Cl.
CPC ......... *H04W 28/0268* (2013.01); *H04L 41/12* (2013.01)

(58) Field of Classification Search
CPC . H04L 41/0894; H04L 41/12; H04L 41/5058; H04W 28/0268
See application file for complete search history.

(56) References Cited

U.S. PATENT DOCUMENTS

| | | | |
|---|---|---|---|
| 11,252,048 B2* | 2/2022 | Mladin | H04L 41/12 |
| 11,864,098 B2* | 1/2024 | Castellanos Zamora | H04W 48/18 |
| 2018/0041984 A1* | 2/2018 | Li | H04W 8/08 |
| 2021/0068045 A1* | 3/2021 | Regnault | H04L 43/10 |
| 2021/0092673 A1* | 3/2021 | Young | H04W 4/029 |
| 2021/0367916 A1* | 11/2021 | Belling | H04L 41/5058 |
| 2021/0368427 A1* | 11/2021 | Rommer | H04W 48/16 |
| 2022/0039003 A1* | 2/2022 | Castellanos Zamora | H04W 8/20 |
| 2022/0337989 A1* | 10/2022 | Ferdi | H04W 8/005 |
| 2022/0394088 A1* | 12/2022 | Salkintzis | H04L 61/4511 |
| 2023/0036465 A1* | 2/2023 | Mattsson | H04L 67/51 |

FOREIGN PATENT DOCUMENTS

| | | | | |
|---|---|---|---|---|
| WO | WO-2019015778 A1 * | 1/2019 | ......... | H04L 67/1097 |
| WO | WO-2019238049 A1 * | 12/2019 | ......... | H04L 12/2874 |

* cited by examiner

*Primary Examiner* — Kashif Siddiqui

(57) ABSTRACT

A system described herein may provide a technique for an inter-segment Network Function ("NF") discovery procedure in a network that includes multiple discrete network segments. The network segments may each include a respective set of NFs. An NF discovery request may include discovery parameters such as an identifier of a User Equipment ("UE"). Network segments may be checked in a sequential or hierarchical manner to determine whether a respective network segment includes an instance of the requested NF that matches the discovery parameters (e.g., is associated with the UE identified in the NF discovery request).

20 Claims, 13 Drawing Sheets

SYSTEMS AND METHODS FOR NETWORK FUNCTION DISCOVERY IN A SEGMENTED NETWORK

BACKGROUND

Wireless networks, such as Fifth Generation ("5G") networks, may include a core network that includes network functions ("NFs") that perform various operations related to routing traffic, session establishment, Quality of Service ("QoS") enforcement, or other operations. Some core networks may be segmented, where different segments include instances of some or all NFs associated with the core network. Segments may be deployed in geographically diverse locations, such as one segment serving one portion of a service area (e.g., a portion of a country, a state, a province, etc.) and another segment serving another portion of the service area.

DETAILED DESCRIPTION OF EXAMPLE EMBODIMENTS

The following detailed description refers to the accompanying drawings. The same reference numbers in different drawings may identify the same or similar elements.

Embodiments described herein provide for the discovery of, and/or communication with, network functions ("NFs"), such as virtualized NFs ("VNFs"), containerized NFs ("CNFs"), or the like, that are located in geographically diverse segments of a wireless network. For example, a wireless network may be or include a core network, which may include a set of NFs, VNFs, CNFs, etc. that perform operations related to providing services associated with the wireless network. Such services may include voice call services, data services, messaging services, and/or other types of services. Different segments of a wireless network may be associated with different geographical regions or portions thereof.

Figure 1A:
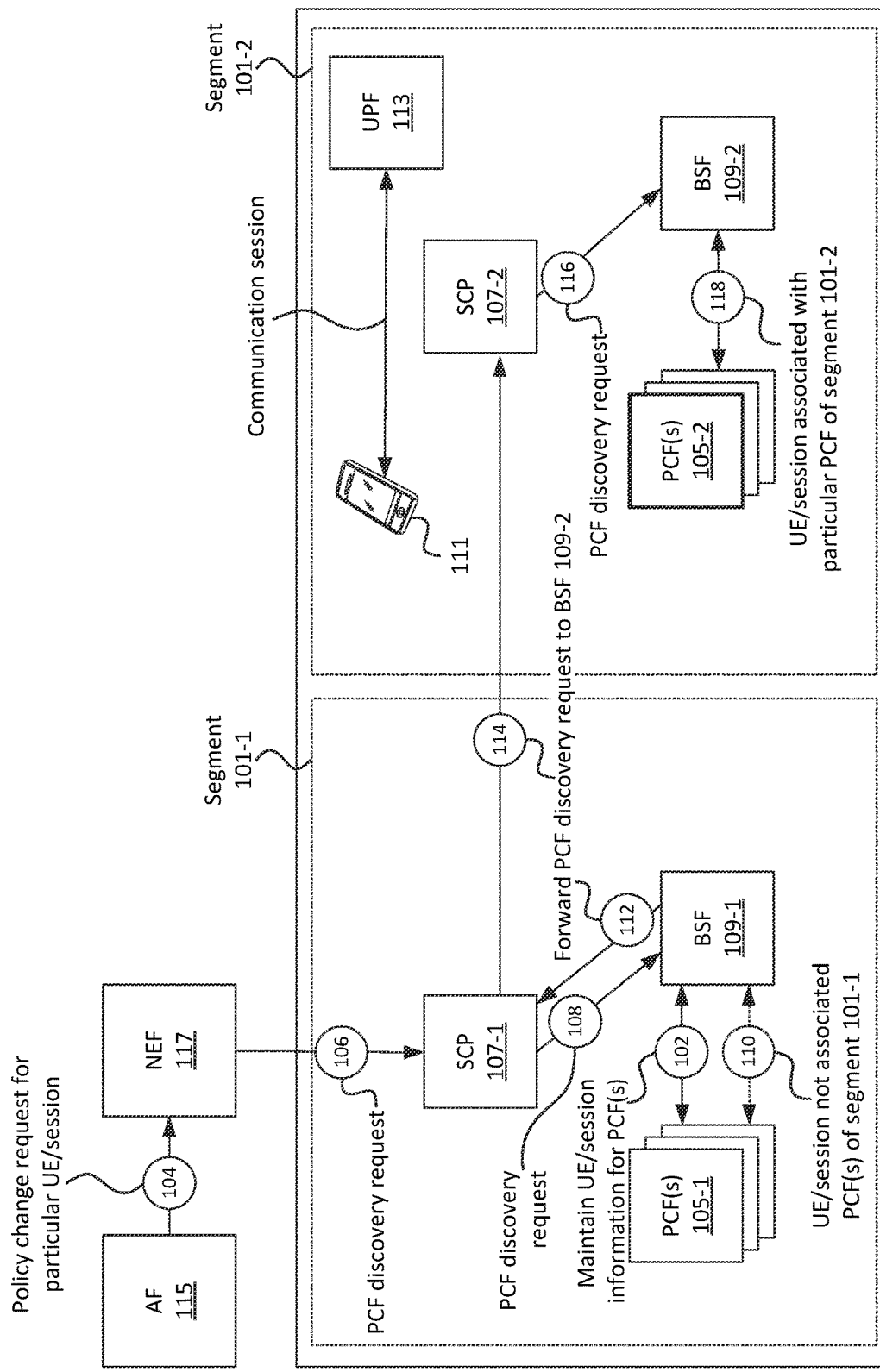
FIGS. 1A, 1B, 2A, and 2B illustrate an example overview of one or more embodiments described herein.

For example, as shown in FIG. 1A, a first segment 101-1 may include a first set of physical hardware (e.g., that implements one or more VNFs, CNFs, etc. associated with segment 101-1) that is located within a first geographical region (e.g., a first portion of service area 103), while a second segment 101-2 may include a second set of physical hardware (e.g., that implements one or more VNFs, CNFs, etc. associated with segment 101-2) that is located within a second geographical region (e.g., a second portion of service area 103 that is distinct from the first portion of service area 103 with which segment 101-1 is associated). In some embodiments, the physical hardware associated with a given segment 101 may be located outside of a particular geographical region to which the given segment 101 provides services. For example, a particular segment 101 may provide services to User Equipment ("UEs") that are located within a given geographical region, but some or all of the physical hardware associated with the particular segment 101 may be located outside of the geographical region.

As noted above, each segment 101 may be associated with a set of NFs (e.g., VNFs, CNFs, etc.) associated with a core network, such as one or more Policy Control Functions ("PCFs"), Session Management Functions ("SMFs"), User Plane Functions ("UPFs"), and/or other network functions. For example, as shown in FIG. 1A, segment 101-1 may include a first set 105-1 of PCFs, and segment 101-2 may include a second set 105-2 of PCFs. For example, the first set 105-1 of PCFs may be implemented by a first set of hardware, while the second set 105-2 of PCFs may be implemented by a second set of hardware (e.g., where the first and second sets of hardware are located in distinct geographical locations). While only PCFs are shown in FIG. 1A, in practice, each segment may include additional and/or different NFs.

Each segment may also include, may implement, may be communicatively coupled to, and/or may otherwise be associated with a respective Service Communication Proxy ("SCP") 107 and Binding Support Function ("BSF") 109. For example, segment 101-1 may include SCP 107-1 and BSF 109-1, and segment 101-2 may include SCP 107-2 and BSF 109-2. A respective SCP 107 may maintain network routing and/or topology information, such as routing information, locator information, discovery information, or other suitable information regarding particular NFs of the core network. For example, SCP 107 may maintain information indicating a particular segment 101 with which a given NF is associated. Referring to FIG. 1A, for instance, SCP 107-1 may maintain information indicating the PCFs, of the second set 105-2 of PCFs, are associated with segment 101-2. For example, SCP 107-1 may maintain information associating Internet Protocol ("IP") addresses and/or other suitable identifiers of the second set 105-2 of PCFs with an identifier of SCP 107-2 and/or an identifier of segment 101-2.

SCPs 107 of different segments 101 may be associated with an inter-segment communication interface, such as an application programming interface ("API"), a tunnel, or some other suitable communication pathway, via which SCPs 107 may communicate with each other (and, accordingly, with NFs of other segments 101). SCPs 107 may also route inbound traffic to particular NFs associated with a corresponding segment 101. For example, SCP 107-1 may receive traffic destined for a particular PCF of set 105-1 of PCFs, and may forward the traffic to the particular PCF. One such example of inbound traffic for a particular NF may include a policy update to one or more policies maintained by a given PCF. Such policies may include, for example, QoS policies, access and/or security policies, or other types of policies.

In some situations, SCP 107 may receive inbound traffic without an indication of which particular PCF or set 105 of PCFs the inbound traffic is associated. For example, SCP 107 may receive a request to modify one or more policies associated with a given UE 111 and/or a session associated with UE 111, but the request may not include an identification of a particular segment 101 in which UE 111 is located, and/or may not identify a particular PCF or set 105 of PCFs with which the UE 111 and/or session is associated. As such, SCP 107, which receives the inbound traffic, may perform a discovery procedure in order to determine which segment 101 includes the appropriate PCF (e.g., with which UE 111 and/or the session is associated), and may forward such traffic to the appropriate PCF (e.g., to the appropriate segment 101).

In some embodiments, as noted above, each segment 101 may include a respective BSF 109. BSF 109 may maintain, for example, information associating a given UE 111 with a given communication session. Such information may include, for example, an identifier of UE 111 (e.g., a Subscription Permanent Identifier ("SUPI"), a Globally Unique Temporary Identifier ("GUTI"), an IP address, a Mobile Directory Number ("MDN"), and/or other suitable identifier). In some embodiments, such information may include an identifier of a particular protocol data unit ("PDU") session (e.g., a Session identifier) or other type of communication session. In some embodiments, such information may include a Data Network Name ("DNN") with which UE 111 and/or a particular communication session is associated. In some embodiments, BSF 109 may maintain information associating a given UE 111, and/or one or more communication sessions associated with UE 111, with a particular PCF and/or some other NF. For example, as shown in FIG. 1A, BSF 109-1 may maintain (at 102) information associating one or more UEs 111, and/or one or more communication sessions associated with such UE 111, with one or more PCFs of the set 105-1 of PCFs associated with segment 101-1. Similarly, BSF 109-2 may maintain information associating one or more UEs 111, and/or one or more communication sessions associated with such UE 111s, with one or more PCFs of the set 105-2 of PCFs associated with segment 101-2.

In the example shown here, UE 111 may be located within a geographical region (e.g., a particular portion of service area 103) serviced by NFs of segment 101-2 (e.g., in lieu of NFs of segment 101-1). As such, UE 111 may be communicatively coupled to one or more NFs of segment 101-2, such as UPF 113, an SMF, and/or one or more other NFs. For example, UE 111 may be engaged in one or more active PDU sessions or other types of communication sessions with UPF 113 associated with segment 101-2.

In some embodiments, the communication sessions(s) between UE 111 may include traffic associated with Application Function ("AF") 115, which may provide application-layer services or other services associated with traffic to and/or from UE 111 (e.g., via UPF 113). For example, AF 115 may include and/or may be communicatively coupled to one or more application servers, teleconference service providers, gaming service providers, content providers, and/or other devices or systems that send and/or receive traffic to and/or from UE 111.

The core network (e.g., which may include segment 101-1, segment 101-2, and/or one or more other segments 101) may provide and/or may be communicatively coupled to Network Exposure Function ("NEF") 117, which may allow AF 115 and/or other devices or systems to send and/or receive information about NFs of the core network, UEs 111 connected to one or more elements of the core network, and/or other suitable network information. NEF 117 may also allow AF 115 and/or other devices or systems to configure aspects of the core network and/or otherwise access parameters of the core network. The level of access granted to AF 115 and/or other devices or systems via NEF 117 may be configured by an operator of NEF 117 and/or the core network. For example, the types or amounts of information regarding NFs and/or UEs 111 associated with the core network may be limited to a selected subset of information, and/or may be restricted only to particular authorized AFs 115 or other devices or systems.

In some embodiments, the core network may include or provide a single NEF 117 for multiple segments 101. Additionally, or alternatively, in some embodiments, the core network may otherwise include or provide one or more NEFs 117 that are each associated with multiple segments 101. In the example shown in FIG. 1A, NEF 117 may process policy change requests for NFs and/or UEs 111 associated with segments 101-1 and 101-2. In some embodiments, NEF 117 may be communicatively coupled to a given SCP 107 of a particular segment 101. In the example shown in FIG. 1A, NEF 117 may be communicatively coupled to SCP 107-1 of segment 101-1. As such, as discussed herein, SCP 107-1 may serve as an interface or proxy for messages between NFs of segment 101-1 and segment 101-2.

The policy change request may include, for example, a requested change to QoS parameters associated with a given UE 111, a requested change to an authorized list of DNNs associated with a given UE 111, and/or some other type of policy change. In some embodiments, the policy change request may include an identifier of UE 111, such as a SUPI, a GUTI, an IP address, etc. In some embodiments, NEF 117 and/or some other device or system may authenticate AF 115, determine whether AF 115 is authorized to make such policy change, and/or perform one or more other suitable operations. In this example, assume that AF 115 has been determined as authorized (e.g., by NEF 117) to make the requested policy change.

In order to make the requested policy change, NEF 117 may perform a discovery procedure (e.g., as provided herein) in order to determine an appropriate NF to which the policy change request should be forwarded. In this example, NEF 117 may perform the discovery request in order to identify a particular PCF to which the policy change should be made. As noted above, NEF 117 may be included in a core network that is associated with multiple segments 101, such as segments 101-1 and 101-2. As such, when receiving (e.g., at 104) policy requests, the discovery procedure in which NEF 117 participates may include identifying a particular segment 101 in which the appropriate NF (e.g., PCF in this example) is located.

For example, as described herein, NEF 117 may initiate a discovery procedure in which NEF 117 identifies that UE 111 is communicatively coupled to UPF 113 of segment 101-2, and that the policy change should therefore be provided to one or more PCFs of the set 105-2 of PCFs associated with segment 101-2. As noted above, NEF 117 may be communicatively coupled to SCP 107-1 of segment 101-1. Thus, in accordance with embodiments described herein, SCP 107-1 and/or one or more other NFs of segment 101-1 may communicate with SCP 107-2 in order to perform the discovery procedure to identify that the requested policy change should be provided to one or more PCFs associated with segment 101-2.

Based on receiving (at 104) the policy change request from AF 115, NEF 117 may output (at 106) a PCF discovery request to SCP 107-1. The PCF discovery request may include an identifier of UE 111, such as a SUPI, a GUTI, an IP address, and/or some other suitable identifier. Based on receiving (at 106) the PCF discovery request, SCP 107-1 may output (at 108) a PCF discovery request to BSF 109-1 (e.g., a particular BSF 109 associated with the same segment 101-1 as SCP 107-1). For example, as noted above, BSF 109-1 may maintain (at 102) information associating UEs with PCFs and/or session information between such UEs and NFs of segment 101-1.

BSF 109-1 may determine (at 110) that the UE identifier(s) included in the PCF discovery request do not correspond to any PCFs (and/or other NFs) associated with segment 101-1. As such, BSF 109-1 may forward (at 112) the PCF discovery request to BSF 109-2. For example, BSF 109-1 may maintain information indicating that BSF 109-2 is a "next" BSF 109 to check when BSF 109-1 determines that a requested NF is not associated with segment 101-1, with which BSF 109-1 is associated. BSF 109-1 may, for example, store an identifier of BSF 109-2 (e.g., an IP address and/or other suitable identifier), of SCP 107-2, and/or of segment 101-2. When determining (at 110) that the requested PCF is not associated with segment 101-1, BSF 109-1 may provide (at 112) an identifier of BSF 109-2, SCP 108-2, and/or segment 101-2 in the PCF discovery request. In some embodiments, the PCF discovery request (at 112) may be a "wrapped" version of the PCF discovery request (received at 108). For example, the "wrapped" PCF discovery request (at 112) may include an identifier of BSF 109-2, SCP 108-2, and/or segment 101-2 in header information of one or more packets that wrap or encapsulate some or all of the PCF discovery request (at 108).

SCP 107-1 may output (at 114) the PCF discovery request (e.g., the "wrapped" PCF discovery request) to SCP 107-2, based on the indication from BSF 109-1 of BSF 109-2, SCP 107-2, and/or segment 101-2. For example, in some embodiments, SCP 107-1 may maintain mapping information, network topology information, routing information, etc. that indicates that BSF 109-2 is associated with SCP 107-2 and/or segment 101-2, that SCP 107-2 is associated with BSF 109-2 and/or segment 101-2, and/or that segment 101-2 is associated with BSF 109-2 and/or SCP 107-2. SCP 107-1 may output (at 114) the PCF discovery request via inter-segment communication, which may include one or more APIs, tunnels, and/or other suitable communication pathways.

SCP 107-2 may output (at 116) the PCF discovery request to BSF 109-2. For example, SCP 107-2 may "unwrap" a wrapped PCF discovery request (e.g., as generated by BSF 109-1). In this manner, the PCF discovery request (at 116) may include information pertaining to the requested UE 111 (e.g., as provided by AF 115 and/or NEF 117). In some embodiments, the PCF discovery request (at 116) may forgo including (e.g., may not include) information added by BSF 109-1, such as one or more identifiers of SCP 107-2, BSF 109-2, and/or segment 101-2.

In some embodiments, the PCF discovery request (at 116) may include one or more identifiers of BSF 109-1, SCP 107-1, and/or segment 101-1. For example, SCP 107-2 may include such information based on receiving the PCF discovery request from SCP 107-1, in order for SCP 107-2 to provide a PCF discovery response to BSF 109-1 (e.g., via SCP 107-1). Additionally, or alternatively, SCP 107-2 may maintain information associating the PCF discovery request with SCP 107-1, BSF 109-1, and/or segment 101-1, and may not provide (at 116) such information to BSF 109-2.

In this example, BSF 109-2 may identify (at 118) that the requested UE 111 is associated with a particular PCF of the set 105-2 of PCFs associated with segment 101-2. For example, such PCF may be communicatively coupled to UPF 113 of segment 101-2, to which UE 111 is communicatively coupled (e.g., involved in one or more PDU sessions or other types of communication sessions).

Figure 1B:
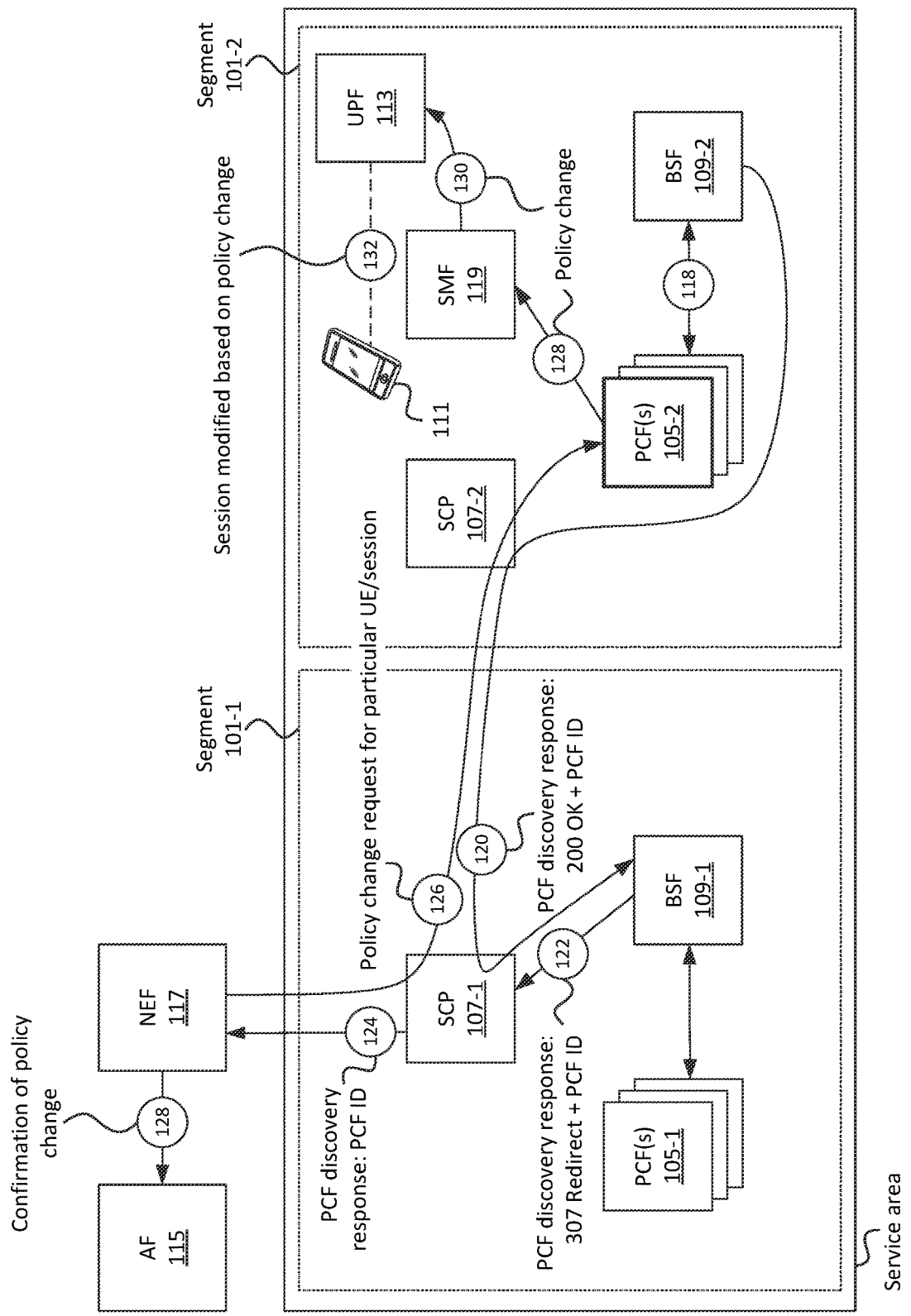

As shown in FIG. 1B, once BSF 109-2 determines (at 118) that the requested policy change is associated with a particular NF (e.g., PCF, in this example) associated with segment 101-2, BSF 109-2 may output (at 120) a discovery response. The discovery response may be or may include a PCF discovery response, which may indicate an identifier of the identified PCF associated with the policy change request. For example, as discussed above, the identified PCF may be a particular PCF of the set 105-2 of PCFs associated with segment 101-2, such as a particular PCF for which BSF 109-2 maintains information as being associated with UE 111 and/or one or more sessions (e.g., PDU sessions) associated with UE 111.

In some embodiments, the PCF discovery response may be or may include a "200 OK" message (e.g., a Hypertext Transfer Protocol ("HTTP") message having a type of "200 OK") or some other suitable type of message, indicating that BSF 109-2 successfully identified an NF to which the policy change request is directed. The PCF discovery response may include an identifier (e.g., an IP address or other suitable identifier) of BSF 109-1, SCP 107-1, and/or segment 101-1. For example, as discussed above, the discovery request received by BSF 109-2 may indicate BSF 109-1 as a sender of the discovery request, and BSF 109-2 may accordingly indicate BSF 109-1 as a recipient of the discovery response.

As another example, in some embodiments, the discovery request received by BSF 109-2 may indicate SCP 107-1 as a sender of the discovery request, and BSF 109-2 may indicate SCP 107-1 as a recipient of the discovery response. In such a scenario, SCP 107-1 may maintain information correlating the discovery request (and accordingly, the discovery response) as being associated with BSF 109-1, and may forward the discovery response to BSF 109-1 based on such correlation information.

As yet another example, in some embodiments, the discovery request received by BSF 109-2 may indicate SCP 107-2 as a sender of the discovery request, and BSF 109-2 may indicate SCP 107-2 as a recipient of the discovery response. For example, as discussed above, the discovery request received by BSF 109-2 may be "wrapped" or encapsulated by SCP 107-2, and SCP 107-2 may accordingly maintain information correlating the discovery request (and accordingly, the discovery response) as being associated with SCP 107-1, BSF 109-1, and/or segment 101-1. Accordingly, SCP 107-2 may forward the discovery response to BSF 109-1 (e.g., via SCP 107-1) based on such correlation information.

Based on receiving (at 120) the discovery response from segment 101-2 (e.g., from BSF 109-2), BSF 109-1 may output (at 122) a PCF discovery response to SCP 107-1. In some embodiments, the PCF discovery response may include a "307 Temporary Redirect" message (e.g., an HTTP 307 message) or some other suitable type of message. The PCF discovery response may include an identifier of the particular PCF of the set 105-2 of PCFs, associated with segment 101-2, identified (at 118) by BSF 109-2. Such identifier may include an IP address or other suitable identifier via which the identified PCF may be located or otherwise communicated with.

In some embodiments, the discovery response (at 122) may be the same format as a discovery response provided by BSF 109-1 to SCP 107-1 in situations where BSF 109-1 identifies that the requested NF is associated with the same segment 101-1 as BSF 109-1. That is, regardless of in which particular segment 101 the requested NF is located, the discovery response may be provided in the same manner, format, protocol, etc. by BSF 109-1 to SCP 107-1. In this manner, the cross-segment discovery procedure (e.g., associated with arrows 112, 114, 116, 118, and 120) may be performed as a separate and/or independent procedure from the request (e.g., at 108) for a given NF by SCP 107-1 and the response (e.g., at 122) with the identifier of the requested NF. As such, as discussed in further detail below, some embodiments may include different operations for performing an inter-segment NF discovery procedure.

Once SCP 107-1 receives (at 122) the PCF discovery response with the identifier of the particular PCF (e.g., associated with segment 101-2, in this example), SCP 107-1 may output (at 124) the identifier of the particular PCF to NEF 117. Once NEF 117 receives the identifier of the particular PCF, NEF 117 may output (at 126) a policy change request, based on the change request received (at 104) from AF 115, to the identified particular PCF. For example, as shown, NEF 117 may output (at 126) the policy change request to SCP 107-1. The policy change request may include the identifier of the particular PCF, based on which SCP 107-1 may forward the change request to the particular PCF accordingly. For example, SCP 107-1 may identify (e.g., based on routing information, network topology information, or the like) that the particular PCF indicated in the request (at 126) is associated with segment 101-2, and may accordingly forward the policy change request to SCP 107-2, which may forward the policy change request to the indicated PCF of the second set 105-2 of PCFs associated with segment 101-2.

Once the selected PCF of the second set 105-2 of PCFs receives the policy change request, the selected PCF may validate the request and/or may proceed to effect a modification to parameters of one or more NFs based on the policy change request. For example, as shown, in this example, the PCF may output (at 128) a policy change message to a particular SMF 119 associated with segment 101-2, such as a particular SMF 119 (e.g., out of a set of SMFs 119) that is communicatively coupled to UPF 113, with which UE 111 is involved in one or more communication sessions (e.g., PDU sessions). SMF 119 may output (at 130) a policy change message to UPF 113, which may implement the indicated policy change. For example, as discussed above, such policy change may include a modification to QoS parameters or other suitable changes. As such, one or more sessions between UPF 113 may be modified (at 132) based on the policy change.

Figure 2A:
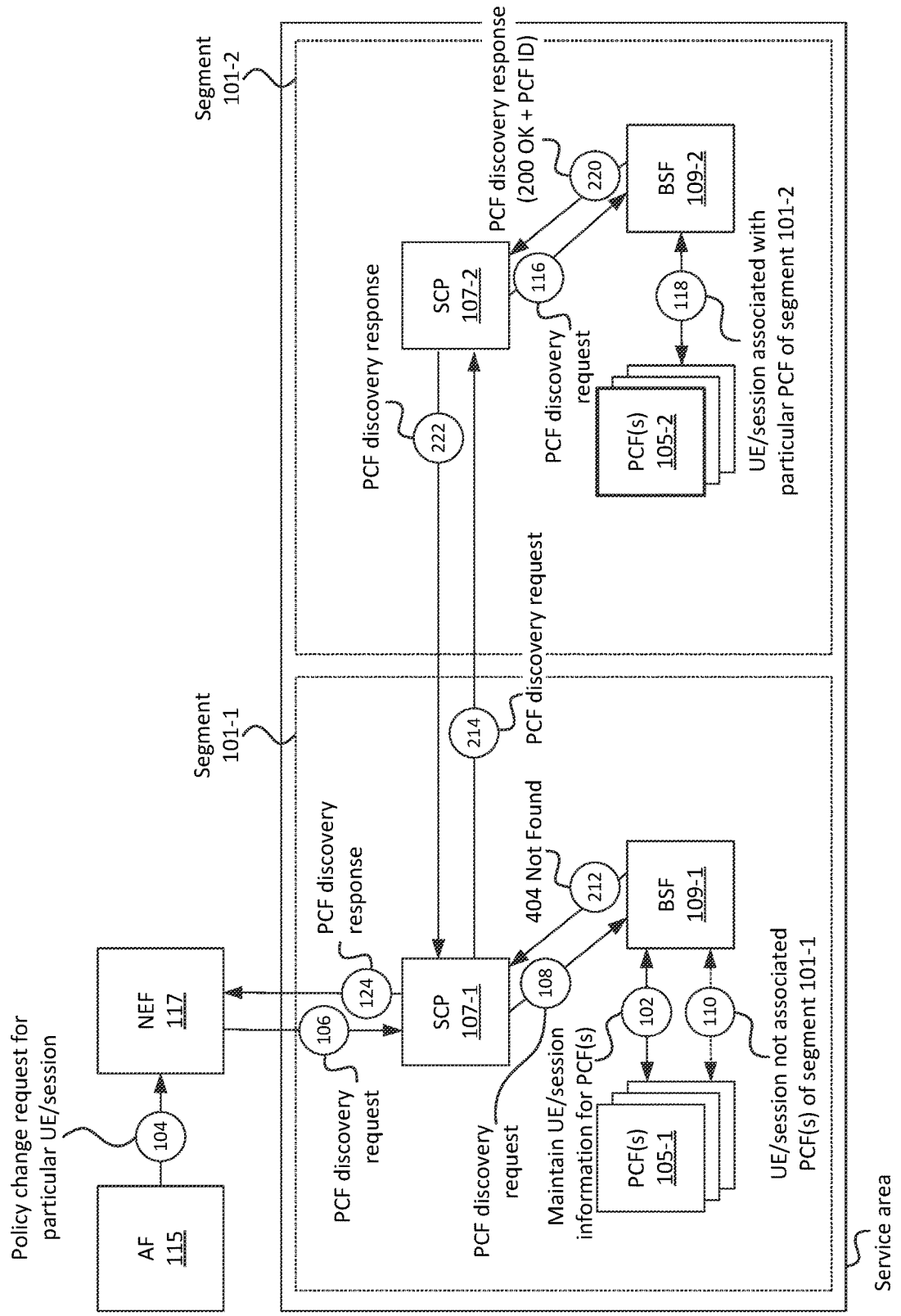
Figure 2B:
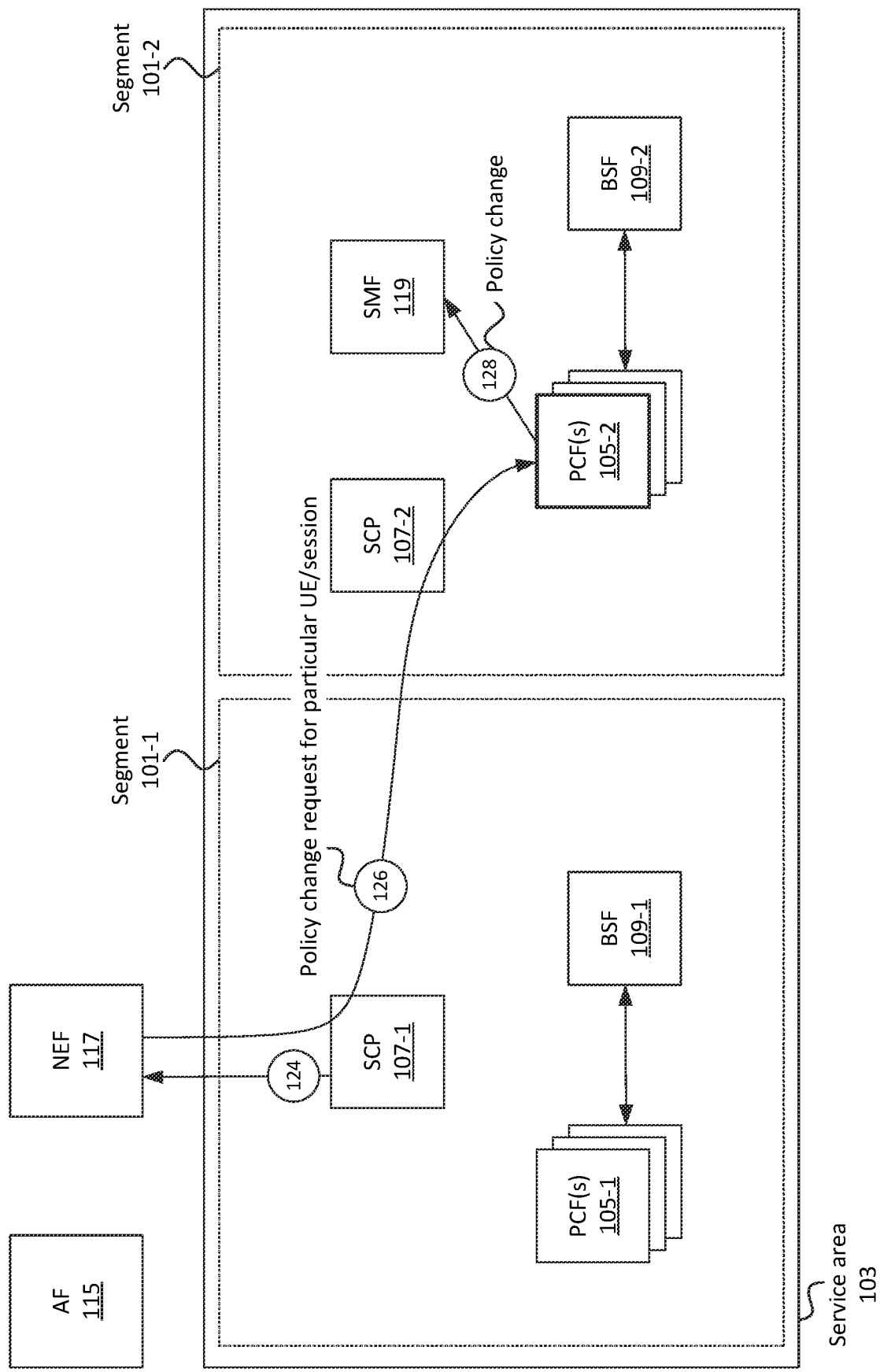

As noted above, in some embodiments, the inter-segment discovery procedure may include one or more different operations than those provided in the examples of FIGS. 1A and 1B. FIGS. 2A and 2B illustrate an example embodiment in which when BSF 109-1 does not locate the requested NF in segment 101-1, BSF 109-1 does not specifically indicate a destination to which a subsequent discovery request should be forwarded. Instead, SCP 107-1 and/or some other suitable device or system may determine another segment 101 and/or BSF 109 to which the subsequent discovery request should be forwarded. Some of the operations shown in FIGS. 2A and 2B are the same or similar as operations shown in FIGS. 1A and 1B. Such operations are numbered with the same reference numerals in FIGS. 1A, 1B, 2A, and 2B, and are not described again in detail below for the sake of brevity.

As shown in FIG. 2A, BSF 109-1 may determine (at 110) that an NF associated with a request (e.g., a policy change request from AF 115 at 104) is not associated with segment 101-1, with which BSF 109-1 is associated. As such, BSF 109-1 may output (at 212) an HTTP "404 Not Found" message or other suitable message to SCP 107-1, indicating that the requested NF is not associated with segment 101-1 (e.g., with which SCP 107-1 and BSF 109-1 are associated). As such, SCP 107-1 may identify a "next" segment 101, SCP 107, and/or BSF 109, to which the discovery request should be forwarded. For example, SCP 107-1 may maintain a pointer or other information indicating which segment 101, SCP 107, and/or BSF 109 should be checked in the even that the requested NF is not located in segment 101-1. In this example, SCP 107-1 may maintain information indicating that segment 101-2 is the "next" segment, that SCP 107-2 is the "next" SCP, and/or that BSF 109-2 is the "next" BSF to check. As such, SCP 107-1 may output (at 214) a discovery request to SCP 107-2, based on the discovery request received (at 106) from NEF 117 and further based on the indication (at 212) from BSF 109-1, indicating that the requested NF is not associated with segment 101-1.

As similarly discussed above, SCP 107-2 may forward (at 116) the discovery request to BSF 109-2, which may identify (at 118) that the requested NF is associated with segment 101-2. Based on identifying (at 118) that the requested NF (e.g., PCF) is associated with segment 101-2, BSF 109-2 may output (at 220) a discovery response, which may include an HTTP "200 OK" message or other suitable message. As similarly noted above, the discovery response may include an identifier of the identified NF (e.g., a particular PCF of the set 105-2 of PCFs associated with segment 101-2). SCP 107-2 may output (at 222) a discovery response to SCP 107-1, indicating the identified NF (e.g., the particular PCF of the set 105-2 of PCFs in this example). SCP 107-1 may accordingly output (at 124) a discovery response to NEF 117, indicating the identified NF.

Accordingly, as shown in FIG. 2B, NEF 117 may output (at 126) the requested policy change to the identified NF (e.g., via SCP 107-1 and/or SCP 107-2). The identified NF (e.g., particular PCF, in this example) may output (at 128) a policy change message to SMF 119, which may perform one or more other suitable operations (e.g., may output a policy change message to a particular UPF 113 or other suitable operations). Thus, in the example of FIGS. 2A and 2B, BSFs 109 need not maintain information regarding inter-segment discovery procedures (e.g., a "next" segment 101, SCP 107, and/or BSF 109). For example, such information may be maintained or determined by one or more SCPs 107, in accordance with some embodiments.

Figure 5:
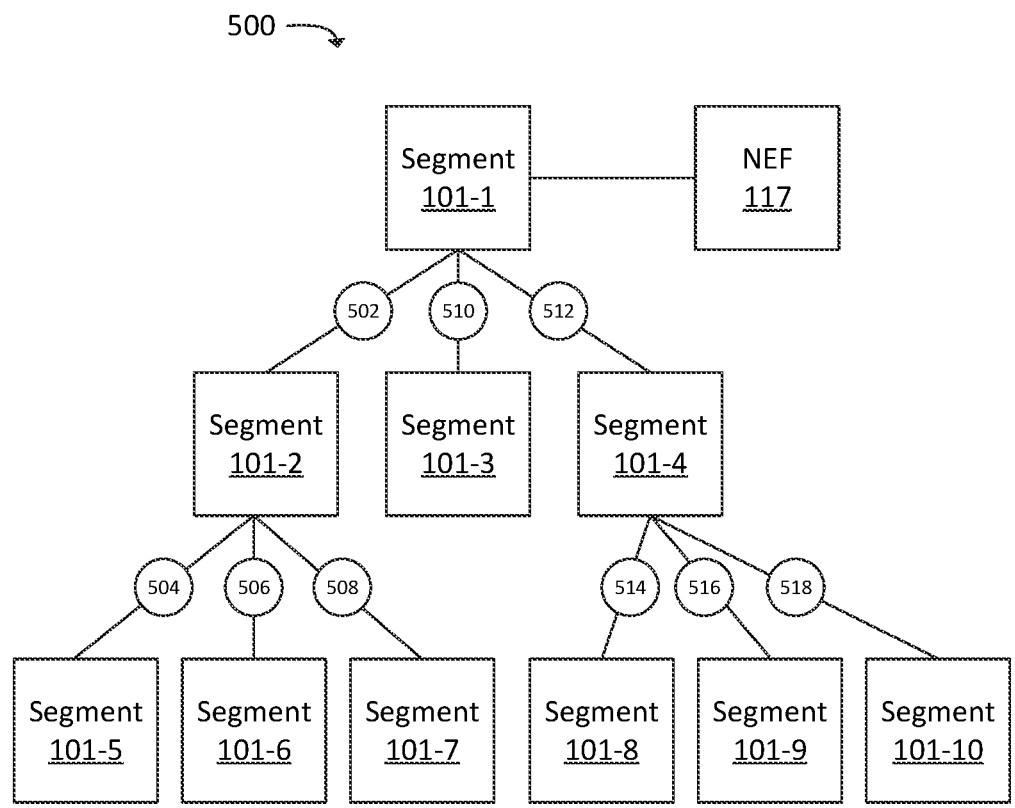
FIG. 5 illustrates an example of a hierarchical inter-segment NF discovery procedure, in accordance with some embodiments.

Concepts described above are presented in the context of two segments 101-1 and 101-2. In practice, similar concepts may apply to three or more segments 101. For example, requests may be "chained" to a sequence of segments 101 (e.g., as shown in FIG. 3), and/or segments 101 may be arranged in a hierarchy or tree (e.g., as shown in FIG. 5).

Figure 3:
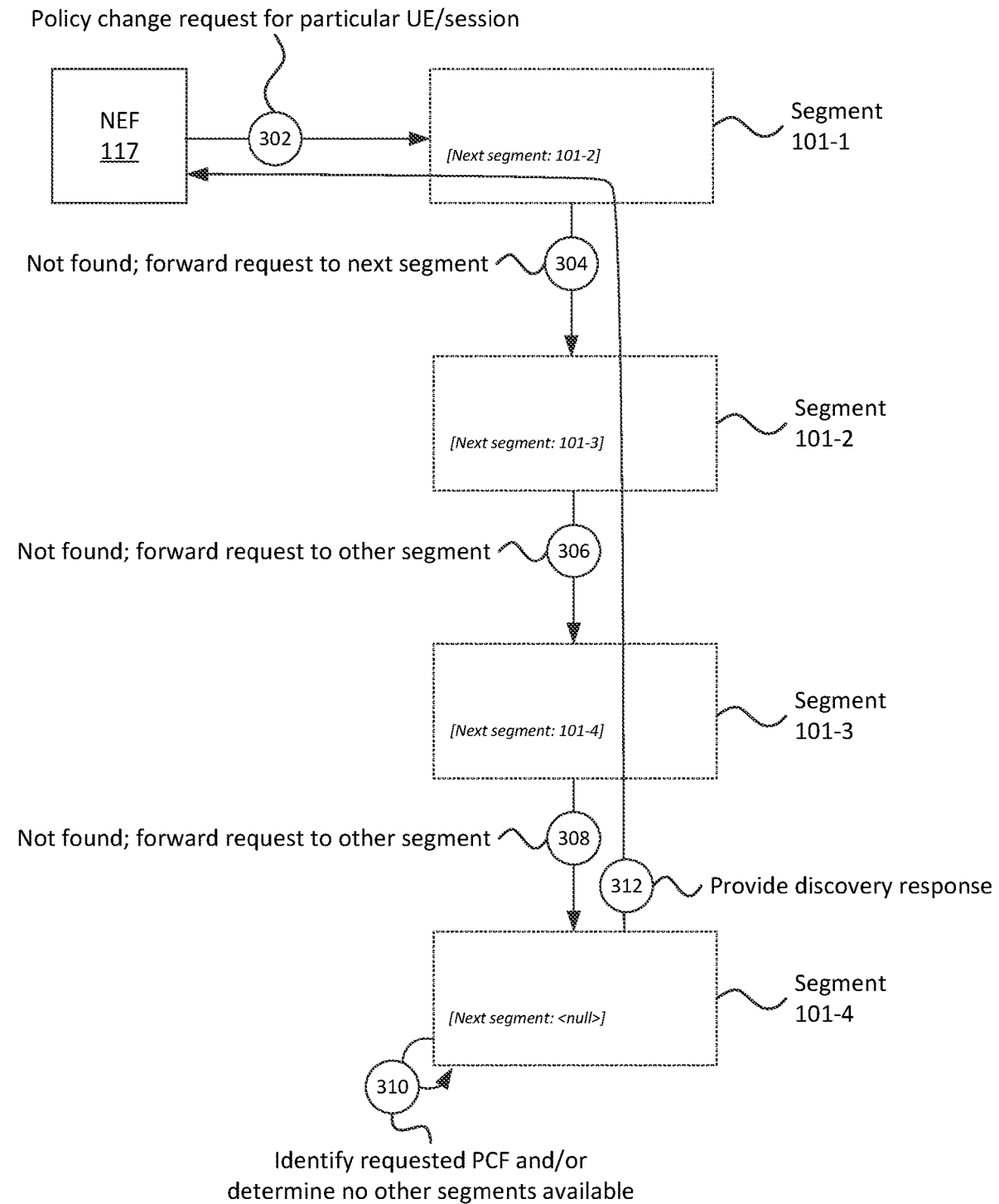
FIGS. 3 and 4 illustrate an example of an inter-segment NF discovery procedure among more than two network segments, in accordance with some embodiments.

For example, as shown in FIG. 3, NEF 117 may output (at 302) a policy change request for a given UE 111 and/or a session associated with UE 111 to segment 101-1 (e.g., to SCP 107-1 associated with segment 101-1—where SCPs 107, BSFs 109, and/or other NFs associated with particular segments 101 are not explicitly shown in FIG. 3 for the sake of clarity). In this example, assume that the requested NF is not associated with segment 101-1. For example, assume BSF 109-1, associated with segment 101-1, may not have located the requested NF in segment 101-1. Further, in accordance with some embodiments, each segment 101 may maintain information indicating a "next" segment 101. For example, SCP 107-1, associated with segment 101-1, may maintain information indicating that segment 101-2 is a "next" segment, that PCF 107-2 (associated with segment 101-2) is a "next" PCF, and/or that BSF 109-2 (associated with segment 101-2) is a "next" BSF. Additionally, or alternatively, BSF 109-1, associated with segment 101-1, may maintain information indicating that segment 101-2 is a "next" segment, that PCF 107-2 is a "next" PCF, and/or that BSF 109-2 is a "next" BSF.

Thus, based on segment 101-1 (e.g., BSF 109-1) determining that the requested NF is not associated with segment 101-1, segment 101-1 may output (at 304) a discovery request to the next segment 101-2. For example, as similarly discussed above (e.g., with respect to FIGS. 1A and/or 2A), BSF 109-1 may output a discovery request addressed to BSF 109-2, SCP 109-2, and/or segment 101-2, and/or SCP 107-1 may output a discovery request addressed to BSF 109-2, SCP 109-2, and/or segment 101-2.

Further, assume that segment 101-2 (e.g., BSF 109-2 associated with segment 101-2) determines that the requested NF is not associated with segment 101-2. Segment 101-2 may accordingly output (at 306) a discovery request to a "next" segment 101 associated with segment 101-2, such as segment 101-3 in this example. Similarly, assume that segment 101-3 determines that requested NF is not associated with segment 101-3. Segment 101-3 may accordingly output (at 308) a discovery request to a "next" segment 101 associated with segment 101-2, such as segment 101-4 in this example.

Further assume that segment 101-4 is a "last" segment in a chain or set of segments, and therefore maintains a "null" value or other value indicating that no "next" segment exists with respect to segment 101-4. Segment 101-4 may identify (at 310) the requested NF (e.g., PCF, in this example), and/or may determine that the requested NF is not associated with segment 101-4. Segment 101-4 may output (at 312) a discovery response, which may indicate an identifier of the NF (if found) or an indication that the NF was not found. In some embodiments, segment 101-4 may provide the discovery response to segment 101-3, which may forward the discovery response to segment 101-2, which may forward the discovery response to segment 101-1, which may forward the discovery response to NEF 117. In some embodiments, segment 101-4 may provide the discovery response to segment 101-1 (e.g., not via segments 101-2 and/or 101-3), which may forward the discovery response to NEF 117.

Figure 4:
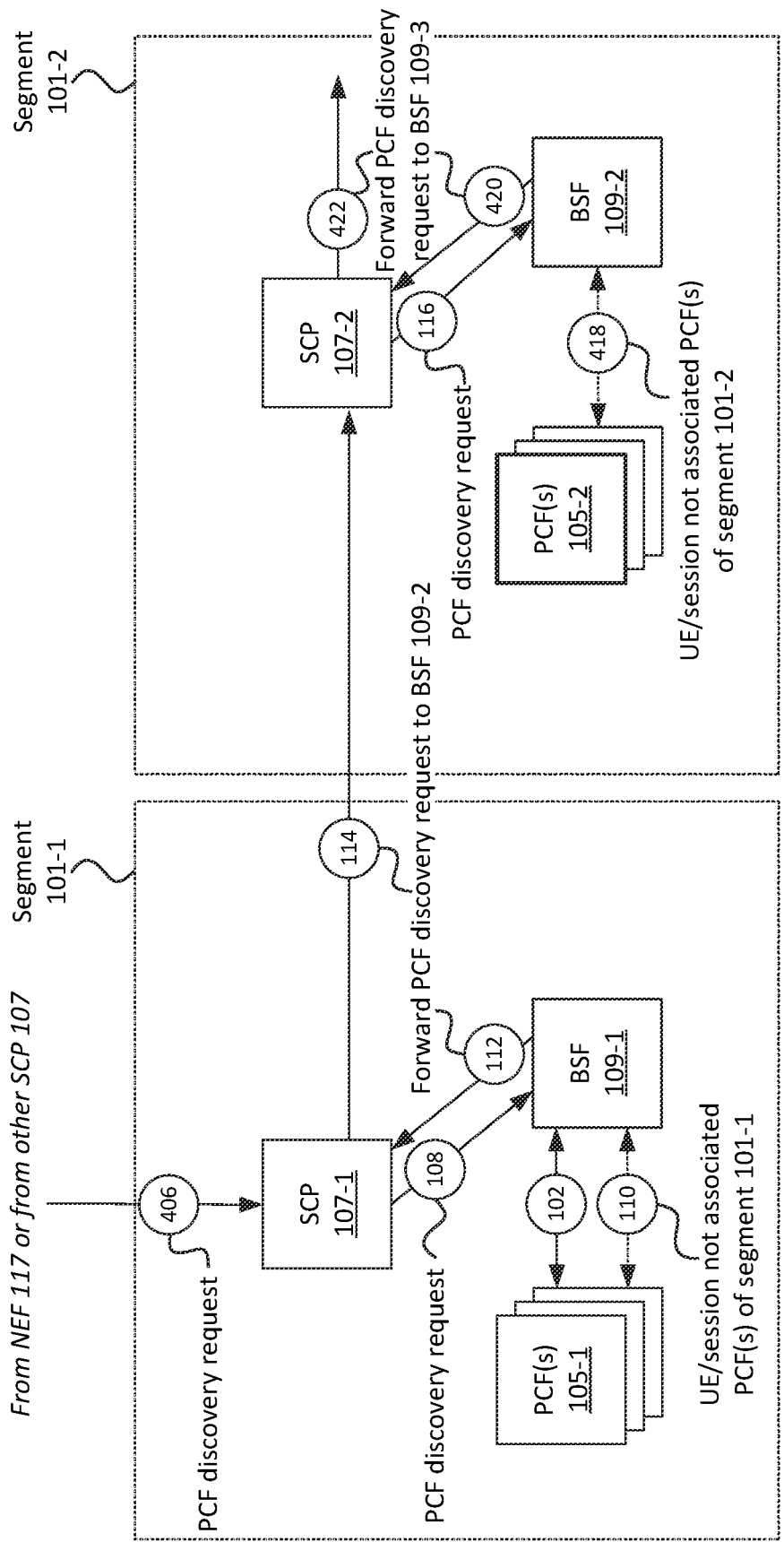

As noted above, the operations shown in FIG. 3 may include similar operations to those shown in FIGS. 1A, 1B, 2A, and/or 2B. For example, as shown in FIG. 4, SCP 107-1 may receive (at 406) a discovery request (e.g., a discovery request for a PCF or other NF associated with a given UE 111). The discovery request may have been received from NEF 117, another SCP 107 (e.g., another SCP 107 associated with another segment 101), and/or some other device or system. Assuming that the requested NF is not associated with segment 101-1, SCP 107-1 may output (at 114) a discovery request to segment 101-2. For example, as discussed above, SCP 107-1 and/or BSF 109-1 may maintain information indicating that segment 101-2 is a "next" segment, that SCP 107-2 is a "next" SCP, and/or that BSF 109-2 is a "next" BSF with respect to segment 101-1, SCP 107-1, and/or BSF 109-1.

In this example, BSF 109-2 may determine (at 418) that the requested NF is not associated with segment 101-2, and may output (at 420) a discovery request to BSF 109-3 (e.g., a "next" BSF with respect to BSF 109-2). Additionally, or alternatively, SCP 107-2 may identify that BSF 109-3 is a "next" BSF, that segment 101-3 is a "next" segment, and/or that SCP 107-3 is a "next" SCP, and may accordingly output (at 422) the discovery request to BSF 109-3 (and/or to SCP 107-3, or otherwise to segment 101-3).

As noted above, in addition to, or in lieu of a sequential "chain," segments 101, SCPs 107, and/or BSFs 109 may be arranged in a hierarchy 500 or tree, such that segments 101 are checked according to the hierarchy or tree in order to perform an inter-segment discovery procedure of some embodiments. For example, as shown in FIG. 5, segment 101-1 may be at a first level of a hierarchy 500 that includes multiple segments 101-1 through 101-10. As further shown, segments 101-2, 101-3, and 101-4 may be at a second level of hierarchy 500, and segments 101-5 through 101-10 may be at a third level of hierarchy 500. Additionally, or alternatively, hierarchy 500 may be or may include a tree, such as a binary search tree or other type of tree arrangement. Additionally, or alternatively, hierarchy 500 may be or may include some other type of arrangement.

Hierarchy 500 may be used to dictate an order, sequence, etc. in which segments 101 are checked for a particular NF during an inter-segment discovery procedure. For example, in some embodiments, segment 101-1 may be a segment to which NEF 117 is communicatively coupled (e.g., segment 101-1 may include SCP 107-1, which is communicatively coupled to NEF 117). In situations where segment 101-1 receives an NF discovery request from NEF 117 and determines that the requested NF is not associated with segment 101-1, segment 101-1 may forward (at 502) a discovery request to segment 101-2. In situations where segment 101-2 receives an NF discovery request (e.g., from segment 101-1) and determines that the requested NF is not associated with segment 101-2, segment 101-2 may forward (at 504) a discovery request to segment 101-5. In situations where segment 101-5 receives an NF discovery request (e.g., from segment 101-2) and determines that the requested NF is not associated with segment 101-5, segment 101-5 may indicate (e.g., to segment 101-2) that the requested NF is not associated with segment 101-5. For example, segment 101-5 may maintain information indicating that segment 101-5 is a "leaf" node of a tree and/or is associated with a lowest level of hierarchy 500.

Accordingly, segment 101-2 may then output (at 506) a discovery request to segment 101-6. Similar operations may occur (e.g., at 508-518) to "traverse" hierarchy 500, such as in a suitable tree traversal procedure in order to check whether the requested NF is associated with any of the segments 101 of hierarchy 500. In some embodiments, some other sequence or traversal technique may be used to search segments 101 in accordance with an NF discovery request. Further, as shown, some levels of hierarchy 500 may bear different relationships to other levels. For example, segment 101-2 and segment 101-3 may be at a second level of hierarchy 500, where segment 101-2 is associated with one or more third level segments (e.g., segments 101-5, 101-6, and 101-7), while segment 101-3 is associated with no third level segments. Further, while segments 101-2 and 101-4 are shown as each being associated with three third level segments, in practice, segments 101-2 and 101-4 may be associated with different quantities of third level segments. Further, while three levels of hierarchy 500 are shown in FIG. 5, in practice, a different quantity of levels may be included in hierarchy 500. Additionally, concepts shown in FIGS. 3 and 5 may be combined. For example, hierarchy 500 may include one or more "chains" of segments, which may be traversed in a similar manner as described above with respect to FIG. 3.

Figure 6:
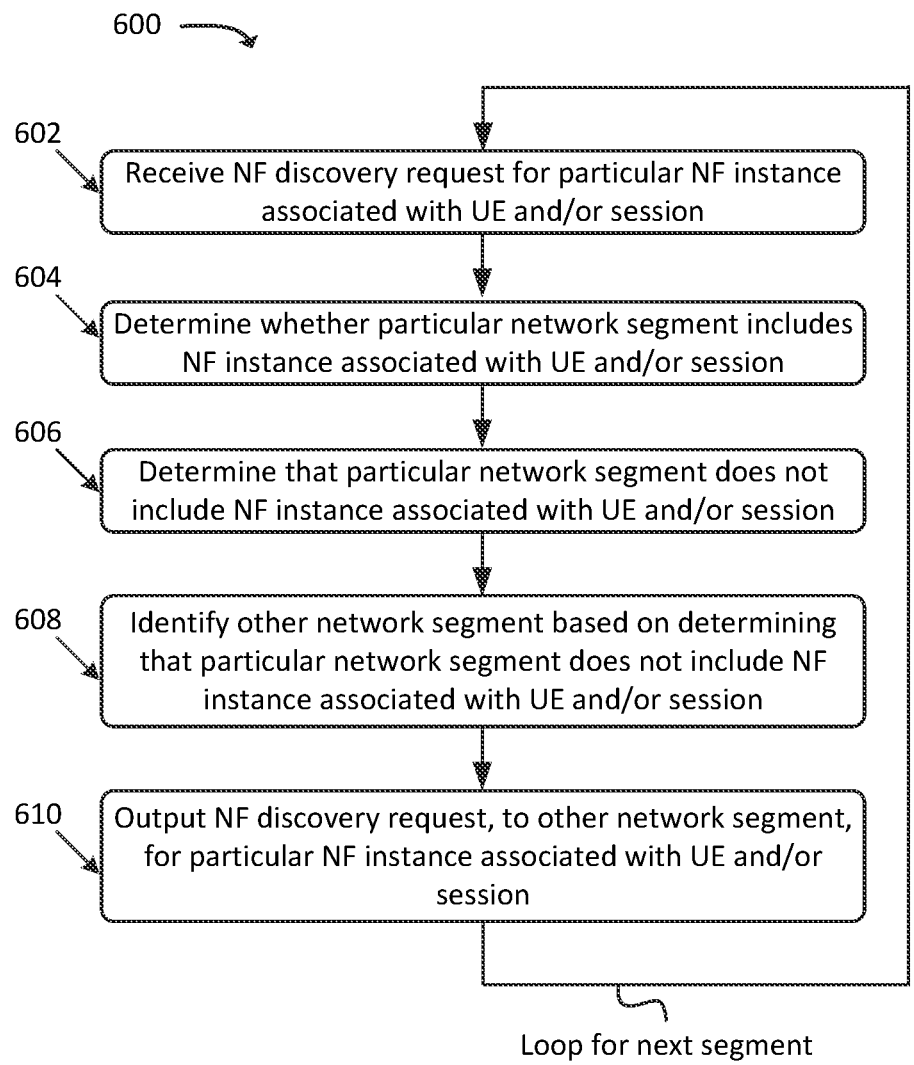
FIGS. 6 and 7 illustrate example processes for an inter-segment NF discovery procedure, in accordance with some embodiments.
Figure 7:
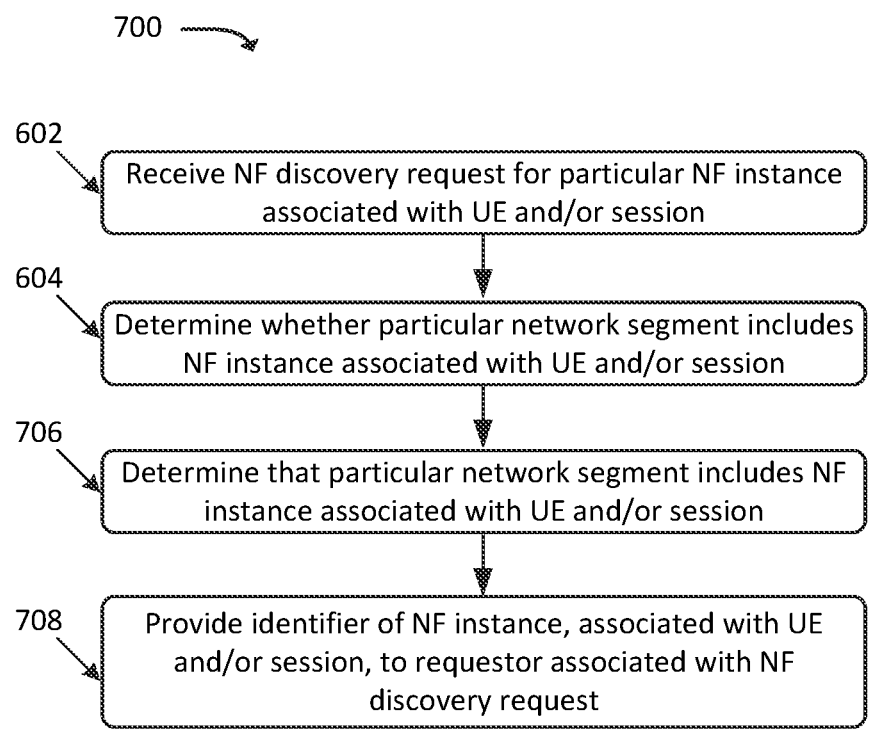

FIGS. 6 and 7 illustrate example processes 600 and 700, respectively, for an inter-segment NF discovery process. In some embodiments, some or all of processes 600 and/or 700 may be performed by devices or systems associated with one or more network segments, such as SCP 107 and/or BSF 109. In some embodiments, one or more other devices may perform some or all of process 600 (e.g., in concert with, and/or in lieu of, SCP 107 and/or BSF 109). Some operations of processes 600 and/or 700 (e.g., blocks 602 and 604) may be the same or similar, and are accordingly provided with the same reference numerals in these figures.

As shown in FIG. 6, process 600 may include receiving (at 602) an NF discovery request for a particular NF instance associated with a particular UE 111 and/or a session associated with UE 111. For example, as discussed above, SCP 107 and/or BSF 109, associated with a particular network segment 101, may receive a request which should be directed to a particular instance of an NF, where the particular network segment 101 and one or more other network segments 101 each include one or more instances of the NF. That is, the discovery request may not specify which particular instance of the NF to which the discovery request is directed. For example, the discovery request may be based on a policy change request received from AF 115, and the policy change request should therefore be directed to a PCF associated with the network. However, the policy change request may not identify which particular PCF should receive the policy change request. The discovery procedure described herein may be used to identify which particular PCF (e.g., which PCF instance out of a set of candidate PCF instances) should receive the policy change request.

The NF discovery request may include, for example, an identifier of a particular UE 111, and/or some other suitable information based on which the NF instance may be identified in accordance with embodiments described herein. In some embodiments, the NF discovery request may be received from NEF 117 and/or some other device or system. In some embodiments, the NF discovery request may be received from a respective SCP 107 associated with a different segment 101. For example, as discussed above, segments 101 may communicate with each other (e.g., via respective instances of SCP 107) in order to perform an inter-segment discovery procedure.

Process 600 may further include determining (at 604) whether the particular segment 101 (e.g., the segment 101 that received (at 602) the NF discovery request) includes an instance of the NF that is associated with UE 111 and/or a session identified in the NF discovery request. For example, as discussed above, BSF 109 and/or some other device or system may maintain information that correlates UEs 111, sessions, etc. with instances of NFs associated with segment 101. In the examples provided above, BSF 109 may maintain information associating one or more PCFs with one or more UEs 111, PDU sessions associated with UEs 111, and/or other suitable information.

Process 600 may additionally include determining (at 606) that the particular segment 101 does not include an NF instance associated with UE 111 and/or a session associated with UE 111. For example, SCP 107 and/or BSF 109 may determine that, of the NFs or NF instances associated with particular segment 101, none of the NFs or NF instances associated with segment 101 are associated with UE 111, one or more sessions associated with UE 111, and/or are otherwise associated with the NF discovery request. For example, assuming that the NF discovery request is a request for a PCF, SCP 107 and/or BSF 109 may determine that segment 101 does not include a PCF that corresponds to the request. For example, BSF 109 may identify information associated with a set 105 of PCFs associated with segment 101, and may determine that the set 105 of PCFs associated with segment 101 do not include any PCFs that are associated with UE 111 and/or one or more sessions associated with UE 111, as indicated in the NF discovery request.

Process 600 may also include identifying (at 608) another network segment 101 (e.g., a second network segment 101-2) based on determining that the particular network segment 101 (e.g., a first network segment 101-1) does not include an NF instance associated with UE 111 and/or one or more sessions indicated in the NF discovery request. For example, SCP 107 may maintain information associated with a "next" SCP 107, BSF 109, and/or segment 101 (e.g., the second segment 101-2) that should be queried in the event that segment 101 (e.g., the first segment 101-1) does not include the requested NF instance. In some embodiments, SCP 107 may receive information regarding the "next" SCP 107, BSF 109, and/or segment 101 from a device or system that maintains a hierarchy 500 and/or otherwise determines which segment should be queried next.

Process 600 may further include outputting (at 610) an NF discovery request to the identified other network segment (e.g., segment 101-2) for a particular NF instance associated with UE 111 and/or a session associated with UE 111. For example, SCP 107, associated with the particular segment 101 (e.g., segment 101-1), may output an NF discovery request to the identified (at 608) other network segment 101 (e.g., segment 101-2). As discussed above, SCP 107 may output the NF discovery request to another SCP 107 (e.g., SCP 107-2) associated with the other segment 101. Some or all of process 600 (and/or process 700, as described below) may be looped or repeated by the other segment 101.

As shown in FIG. 7, process 700 may include receiving (at 602) an NF discovery request, and determining (at 604) whether the particular network segment 101 includes an NF instance associated with UE 111 and/or a session identified in the NF discovery request.

Process 700 may additionally include determining (at 706) that segment 101 includes the requested NF instance (e.g., an instance of the NF that is associated with UE 111 and/or the session identified in the NF discovery request).

Process 700 may also include providing (at 708) an identifier of the NF instance to a requestor (e.g., from which the NF discovery request was received) or some other suitable device or system. For example, SCP 107, associated with the particular segment 101 (e.g., SCP 107-1 of segment 101-1), may output the identifier of the NF instance to an SCP 107 of another segment 101 (e.g., SCP 107-2 of segment 101-2), in scenarios where the NF discovery request was received from SCP 107-2. As another example, SCP 107-1 may output the identifier of the NF instance to a particular SCP that is associated with a higher or highest level of a hierarchy 500.

For example, referring to FIG. 5, assume that segment 101-5 receives (at 702) an NF discovery request from segment 101-2. Such a scenario may occur when segment 101-2 determined that segment 101-2 does not include the requested NF instance. Further assume that segment 101-5 (e.g., SCP 107-5 and/or BSF 109-5 associated with segment 101-5) identifies the requested NF instance is associated with segment 101-5. In this example, segment 101-5 may provide a discovery response directly to segment 101-1 (e.g., SCP 107-1 associated with segment 101-1), based on segment 101-1 being a highest level segment 101 in hierarchy 500. Additionally, or alternatively, segment 101-5 may provide an NF discovery response to segment 101-2, based on receiving an NF discovery request from segment 101-2.

Figure 8:
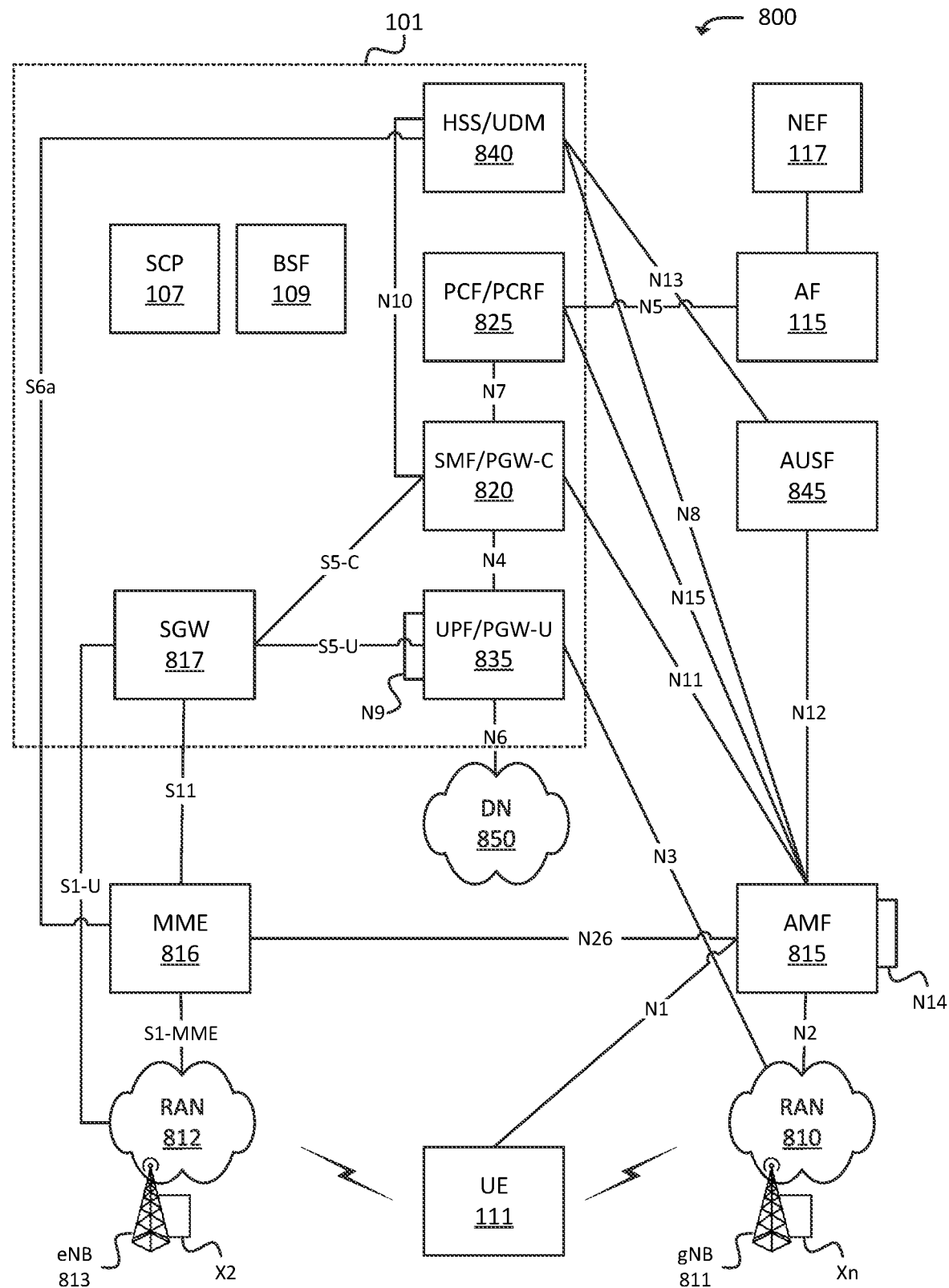
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 111, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, SMF/Packet Data Network ("PDN") Gateway ("PGW")-Control plane function ("PGW-C") 820, PCF/Policy Charging and Rules Function ("PCRF") 825, Application Function ("AF") 830, UPF/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as SCP 107, BSF 109, and/or NEF 117, which may perform one or more operations described above.

In some embodiments, portions of environment 800 may be segmented in a manner described above. As such, FIG. 8 illustrates an example of one segment 101. In practice, environment 800 may include multiple segments 101, which may include some or all of the same components as shown in FIG. 8 with respect to segment 101. In some embodiments, other segments 101 may include additional, fewer, and/or different components than those shown in FIG. 8.

The example shown in FIG. 8 illustrates one instance of each network component or function (e.g., one instance of SMF/PGW-C 820, PCF/PCRF 825, UPF/PGW-U 835, HSS/UDM 840, and/or AUSF 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or AUSF 845, while another slice may include a second instance of SMF/PGW-C 820, PCF/PCRF 825, UPF/PGW-U 835, HSS/UDM 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 111 may include a computation and communication device, such as a wireless mobile communication device that is capable of communicating with RAN 810, RAN 812, and/or DN 850. UE 111 may be, or may include, a radio-telephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 111 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 111 may communicate with one or more other elements of environment 800. UE 111 may communicate with RAN 810 via an air interface (e.g., as provided by gNB 811). For instance, RAN 810 may receive traffic (e.g., voice call traffic, data traffic, messaging traffic, signaling traffic, etc.) from UE 111 via the air interface, and may communicate the traffic to UPF/PGW-U 835, and/or one or more other devices or networks. Similarly, RAN 810 may receive traffic intended for UE 111 (e.g., from UPF/PGW-U 835, AMF 815, and/or one or more other devices or networks) and may communicate the traffic to UE 111 via the air interface.

RAN 812 may be, or may include, a LTE RAN that includes one or more base stations (e.g., one or more eNBs 813), via which UE 111 may communicate with one or more other elements of environment 800. UE 111 may communicate with RAN 812 via an air interface (e.g., as provided by eNB 813). For instance, RAN 810 may receive traffic (e.g., voice call traffic, data traffic, messaging traffic, signaling traffic, etc.) from UE 111 via the air interface, and may communicate the traffic to UPF/PGW-U 835, and/or one or more other devices or networks. Similarly, RAN 810 may receive traffic intended for UE 111 (e.g., from UPF/PGW-U 835, SGW 817, and/or one or more other devices or networks) and may communicate the traffic to UE 111 via the air interface.

AMF 815 may include one or more devices, systems, Virtualized Network Functions ("VNFs"), etc., that perform operations to register UE 111 with the 5G network, to establish bearer channels associated with a session with UE 111, to hand off UE 111 from the 5G network to another network, to hand off UE 111 from the other network to the 5G network, manage mobility of UE 111 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 111 with the EPC, to establish bearer channels associated with a session with UE 111, to hand off UE 111 from the EPC to another network, to hand off UE 111 from another network to the EPC, manage mobility of UE 111 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate the establishment of communication sessions on behalf of UE 111. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 111, from DN 850, and may forward the user plane data toward UE 111 (e.g., via RAN 810, SMF/PGW-C 820, and/or one or more other devices). In some embodiments, multiple UPFs 835 may be deployed (e.g., in different geographical locations), and the delivery of content to UE 111 may be coordinated via the N9 interface (e.g., as denoted in FIG. 8 by the line marked "N9" originating and terminating at UPF/PGW-U 835). Similarly, UPF/PGW-U 835 may receive traffic from UE 111 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 111.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 111 may communicate, through DN 850, with data servers, other UEs 111, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 111 may communicate.

Figure 9:
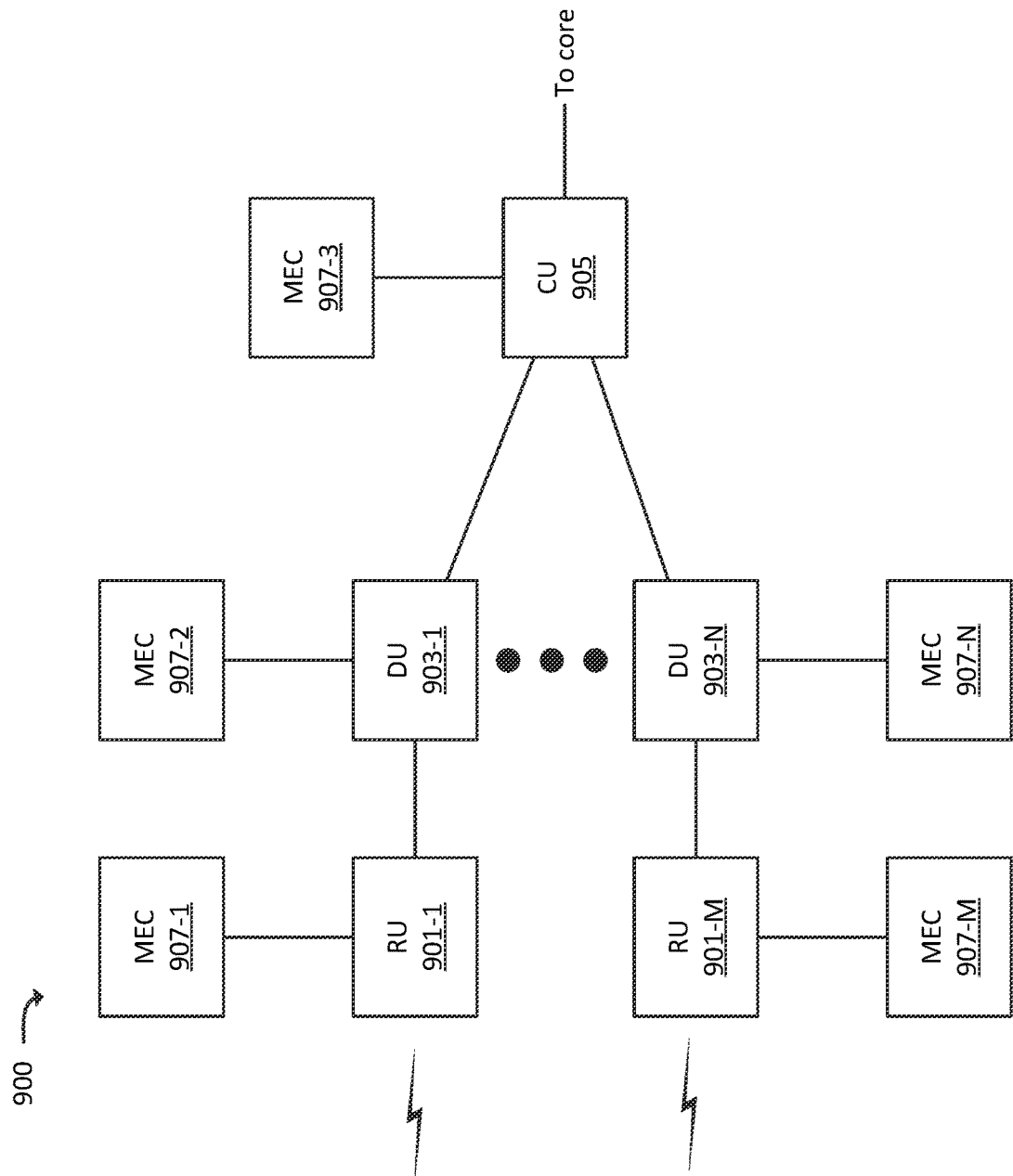
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 111 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 111, and may determine which DU(s) 903 should receive the downlink traffic. DU 903 may include one or more devices that transmit traffic between a core network (e.g., via CU 905) and UE 111 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 111.

RU 901 may include hardware circuitry (e.g., one or more RF transceivers, antennas, radios, and/or other suitable hardware) to communicate wirelessly (e.g., via an RF interface) with one or more UEs 111, one or more other DUs 903 (e.g., via RUs 901 associated with DUs 903), and/or any other suitable type of device. In the uplink direction, RU 901 may receive traffic from UE 111 and/or another DU 903 via the RF interface and may provide the traffic to DU 903. In the downlink direction, RU 901 may receive traffic from DU 903, and may provide the traffic to UE 111 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 111, via a respective RU 901.

For example, RU 901-1 may route some traffic, from UE 111, to MEC 907-1 instead of to a core network (e.g., via DU 903 and CU 905). MEC 907-1 may process the traffic, perform one or more computations based on the received traffic, and may provide traffic to UE 111 via RU 901-1. In this manner, ultra-low latency services may be provided to UE 111, as traffic does not need to traverse DU 903, CU 905, and an intervening backhaul network between DU network 900 and the core network.

Figure 10:
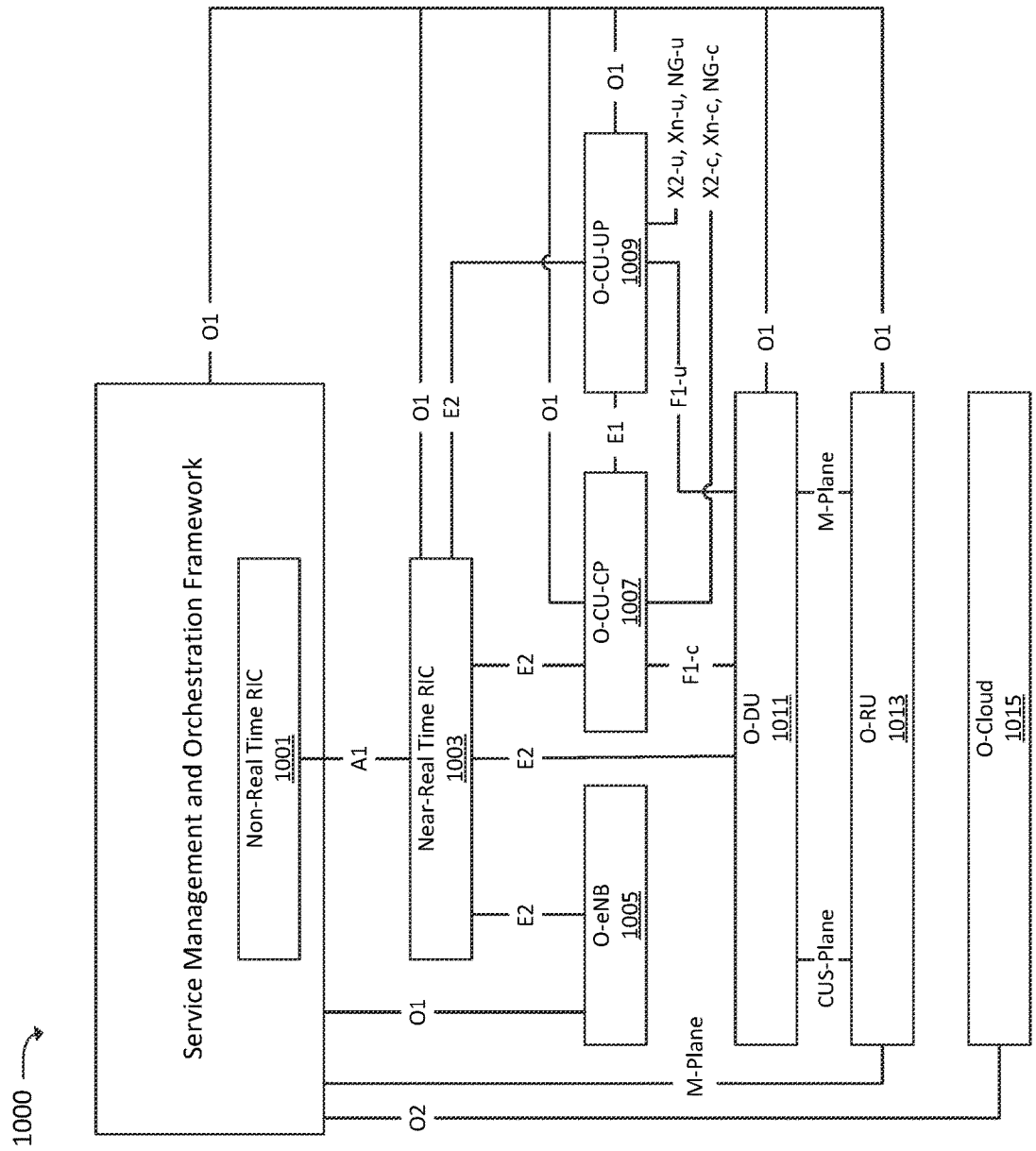
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 810, RAN 812, and/or DU network 900. For example, RAN 810, RAN 812, and/or DU network 900 may include one or more instances of O-RAN environment 1000, and/or one or more instances of O-RAN environment 1000 may implement RAN 810, RAN 812, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 907.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between UE 111 and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 907, which may provide services, and may be communicatively coupled, to O-CU-CP 1007, O-CU-UP 1009, O-DU 1011, and/or O-RU 1013 (e.g., via an O1 and/or O2 interface).

Figure 11:
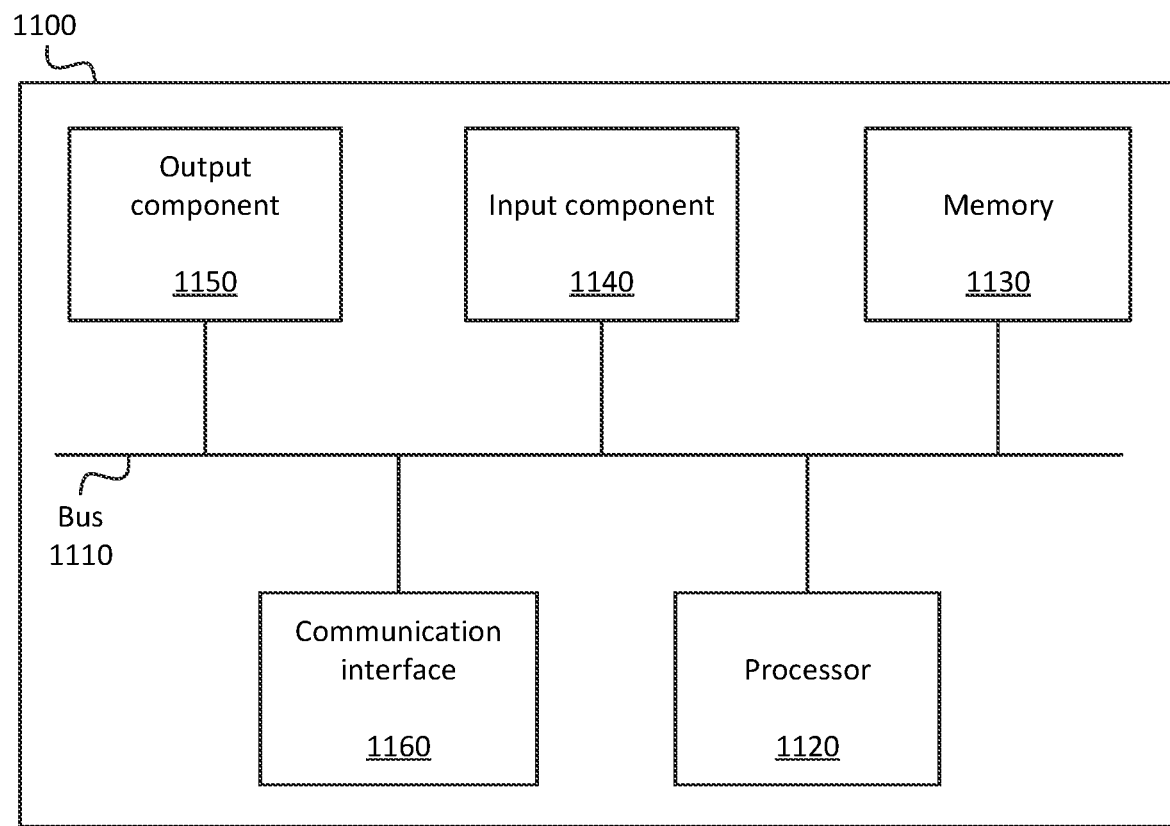
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device.

A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, 2A, 2B, and 3-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a first network function ("NF") discovery request that includes an identifier of a particular User Equipment ("UE");
determine, based on the identifier of the particular UE, whether a first segment of a core network includes a particular instance of the NF that is associated with the particular UE, wherein the first segment includes a first set of instances of the NF;
determine, based on determining whether the first segment of the core network includes the particular instance of the NF that is associated with the particular UE, that the first set of instances of the NF, associated with the first segment of the core network, do not include the particular instance of the NF that is associated with the particular UE; and
output, based on determining that the first set of instances of the NF do not include the particular instance of the NF that is associated with the particular UE, a second NF discovery request to a second segment of the core network, the second NF discovery request including the identifier of the particular UE,
wherein the second segment of the core network determines that a second set of instances of the NF, associated with the second segment of the core network, include the particular instance of the NF that is associated with the particular UE.

2. The device of claim 1, wherein the one or more processors are further configured to:
receive, from the second segment, an identifier of the particular instance of the NF that is associated with the particular UE.

3. The device of claim 2, wherein the first NF discovery request is received from a requesting device, and wherein the one or more processors are further configured to:

provide, to the requesting device, the identifier of the particular instance of the NF that is associated with the particular UE.

4. The device of claim 1, wherein the first segment is associated with a first portion of a geographical service area, and wherein the second segment is associated with a different second portion of the geographical service area.

5. The device of claim 1, wherein outputting the second NF discovery request to the second segment includes outputting the second NF discovery request to a communication proxy associated with the second segment.

6. The device of claim 1, wherein the NF discovery request is based on a policy change request, and wherein the NF includes a Policy Control Function ("PCF") associated with the core network.

7. The device of claim 1, wherein the one or more processors are further configured to select the second segment from a plurality of segments associated with the core network, wherein outputting the second NF discovery request to the second segment is based on the selection of the second segment from the plurality of segments associated with the core network.

8. A non-transitory computer-readable medium, storing a plurality of processor-executable instructions to:
receive a first network function ("NF") discovery request that includes an identifier of a particular User Equipment ("UE");
determine, based on the identifier of the particular UE, whether a first segment of a core network includes a particular instance of the NF that is associated with the particular UE, wherein the first segment includes a first set of instances of the NF;
determine, based on determining whether the first segment of the core network includes the particular instance of the NF that is associated with the particular UE, that the first set of instances of the NF, associated with the first segment of the core network, do not include the particular instance of the NF that is associated with the particular UE; and
output, based on determining that the first set of instances of the NF do not include the particular instance of the NF that is associated with the particular UE, a second NF discovery request to a second segment of the core network, the second NF discovery request including the identifier of the particular UE,
wherein the second segment of the core network determines that a second set of instances of the NF, associated with the second segment of the core network, include the particular instance of the NF that is associated with the particular UE.

9. The non-transitory computer-readable medium of claim 8, wherein the plurality of processor-executable instructions further include processor-executable instructions to:
receive, from the second segment, an identifier of the particular instance of the NF that is associated with the particular UE.

10. The non-transitory computer-readable medium of claim 9, wherein the first NF discovery request is received from a requesting device, and wherein the plurality of processor-executable instructions further include processor-executable instructions to:
provide, to the requesting device, the identifier of the particular instance of the NF that is associated with the particular UE.

11. The non-transitory computer-readable medium of claim 8, wherein the first segment is associated with a first portion of a geographical service area, and wherein the second segment is associated with a different second portion of the geographical service area.

12. The non-transitory computer-readable medium of claim 8, wherein outputting the second NF discovery request to the second segment includes outputting the second NF discovery request to a communication proxy associated with the second segment.

13. The non-transitory computer-readable medium of claim 8, wherein the NF discovery request is based on a policy change request, and wherein the NF includes a Policy Control Function ("PCF") associated with the core network.

14. The non-transitory computer-readable medium of claim 8, wherein the plurality of processor-executable instructions further include processor-executable instructions to select the second segment from a plurality of segments associated with the core network, wherein outputting the second NF discovery request to the second segment is based on the selection of the second segment from the plurality of segments associated with the core network.

15. A method, comprising:
receiving a first network function ("NF") discovery request that includes an identifier of a particular User Equipment ("UE");
determining, based on the identifier of the particular UE, whether a first segment of a core network includes a particular instance of the NF that is associated with the particular UE, wherein the first segment includes a first set of instances of the NF;
determining, based on determining whether the first segment of the core network includes the particular instance of the NF that is associated with the particular UE, that the first set of instances of the NF, associated with the first segment of the core network, do not include the particular instance of the NF that is associated with the particular UE; and
outputting, based on determining that the first set of instances of the NF do not include the particular instance of the NF that is associated with the particular UE, a second NF discovery request to a second segment of the core network, the second NF discovery request including the identifier of the particular UE,
wherein the second segment of the core network determines that a second set of instances of the NF, associated with the second segment of the core network, include the particular instance of the NF that is associated with the particular UE.

16. The method of claim 15, wherein the first NF discovery request is received from a requesting device, the method further comprising:
receiving, from the second segment, an identifier of the particular instance of the NF that is associated with the particular UE; and
providing, to the requesting device, the identifier of the particular instance of the NF that is associated with the particular UE.

17. The method of claim 15, wherein the first segment is associated with a first portion of a geographical service area, and wherein the second segment is associated with a different second portion of the geographical service area.

18. The method of claim 15, wherein outputting the second NF discovery request to the second segment includes outputting the second NF discovery request to a communication proxy associated with the second segment.

19. The method of claim 15, wherein the NF discovery request is based on a policy change request, and wherein the NF includes a Policy Control Function ("PCF") associated with the core network.

20. The method of claim 15, further comprising selecting the second segment from a plurality of segments associated with the core network, wherein outputting the second NF discovery request to the second segment is based on the selection of the second segment from the plurality of segments associated with the core network.

* * * * *